United States Patent
Colby et al.

(10) Patent No.: US 6,304,806 B1
(45) Date of Patent: Oct. 16, 2001

(54) VEHICLE ACCELERATION BASED THROTTLE AREA COMPENSATION

(75) Inventors: Stephen E. Colby, Grand Ledge; Paul A. Bauerle, Fenton; John N. Stockbridge, Novi, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/518,962

(22) Filed: Mar. 6, 2000

(51) Int. Cl.⁷ ................................................ B60K 41/28
(52) U.S. Cl. .......................... 701/70; 701/110; 701/79
(58) Field of Search .............................. 701/70, 110, 79, 701/78, 85, 93, 94

(56) References Cited

U.S. PATENT DOCUMENTS

| | | | |
|---|---|---|---|
| 5,048,631 | * 9/1991 | Etoh | 180/179 |
| 5,835,878 | * 11/1998 | Saito et al. | 701/94 |
| 5,854,989 | * 12/1998 | Speck et al. | 701/93 |
| 5,992,551 | * 11/1999 | Frey et al. | 180/179 |
| 6,042,505 | * 3/2000 | Bellinger | 477/111 |
| 6,110,066 | * 8/2000 | Nedunagadi et al. | 475/5 |
| 6,135,918 | * 10/2000 | Bellinger et al. | 477/111 |

\* cited by examiner

Primary Examiner—William A. Cuchlinski, Jr.
Assistant Examiner—Olga Hernandez
(74) Attorney, Agent, or Firm—Anthony Luke Simon

(57) ABSTRACT

A control system for maintaining powertrain responsiveness adjusts a throttle progression curve to compensate for different vehicle loads. The control system calculates an actual vehicle acceleration rate based on measured vehicle speed for evaluation of total mass being propelled by the vehicle. The calculated actual vehicle acceleration rate is compared to a target vehicle acceleration rate. A throttle progression curve is adjusted based on the results of the comparison so that a subsequent actual vehicle acceleration rate is closer to the target vehicle acceleration rate.

35 Claims, 4 Drawing Sheets

VEHICLE ACCELERATION BASED THROTTLE AREA COMPENSATION

FIELD OF THE INVENTION

The present invention relates to a control system for adjusting a throttle progression curve to compensate for different vehicle loads.

BACKGROUND OF THE INVENTION

The nature of a small truck platform allows for significant changes in vehicle weight and load from cargo carrying and towing. This results in significant differences in vehicle response as the engine operates with no knowledge of additional loads or towing situations. Currently, some production packages offer a trailering mode that can modify the transmission shift patterns without influencing engine output. These packages require the driver to turn on a switch to enable the trailering mode. Modifying the shift patterns of the transmission does not change the relationship between engine output and the driver request signal received from the accelerator pedal.

SUMMARY OF THE INVENTION

It would be desirable to provide a control system for adjusting a throttle progression curve to compensate for different vehicle loads. The present invention takes advantage of the electronic throttle control system to adjust the engine output when the vehicle is operating in a loaded environment. The present invention uses the ratio of current vehicle acceleration to expected acceleration. When the vehicle is accelerating slower than expected, the desired throttle is increased to return the vehicle to the expected performance level. This control system is self contained and it does not require manual operation of a switch to indicate that the vehicle is in a trailering mode. The present invention allows the powertrain control package to learn when the vehicle is operating under loaded conditions and then the throttle control response will be adjusted to account for the performance differences encountered when the vehicle is operating in these conditions. The control system reduces variation that is perceived by the driver when the loading in the vehicle is changed from a normal condition.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
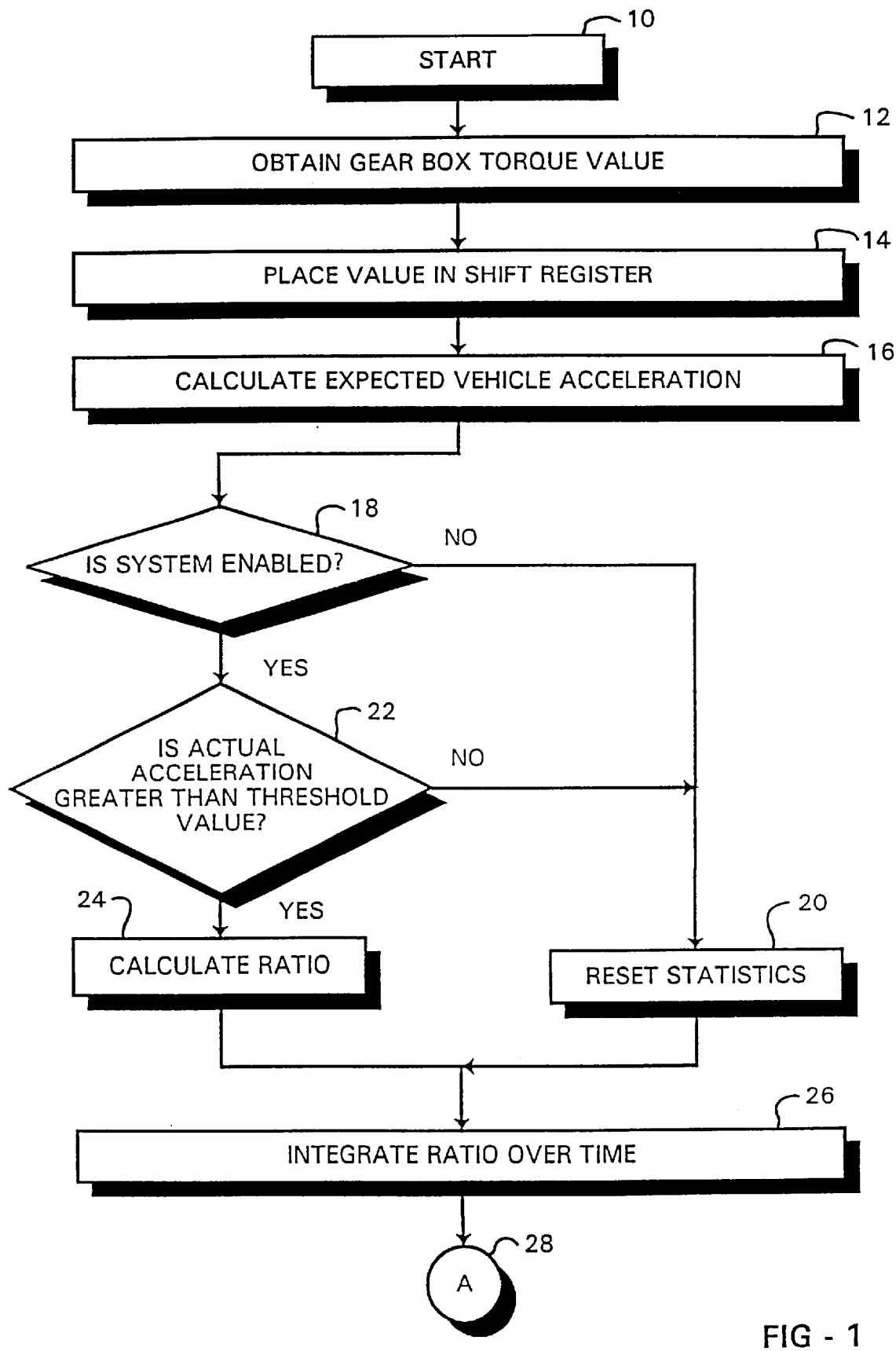
FIG. 1 is a simplified flow diagram illustrating a first portion of the control system according to the present invention.

The control system according to the present invention maintains powertrain responsiveness by adjusting a throttle progression curve to compensate for different vehicle loads. A simplified flow diagram of the control system can be seen in FIGS. 1–4. Referring now to FIG. 1, the control system begins at step 10 where the program is started. The control system then progresses to step 12 where the gear box torque value is obtained. The gear box torque value can be obtained from the wheel torque which is obtainable from the transmission logic, or the wheel torque can be calculated from the engine brake torque, torque converter slip, and N/V (engine speed/vehicle speed) ratio. After the gear box torque value is obtained, the value is placed in a shift register as indicated in step 14. The value is placed in a shift register to delay the value so that it can be matched with the vehicle acceleration response. The expected vehicle acceleration is then calculated from the delayed gear box torque value and the current vehicle speed conditions as indicated in step 16.

The control system then progresses to the query in step 18 to determine whether the system is enabled. The enablement logic is illustrated in greater detail in FIG. 4 which will describe in greater detail below. The enablement logic of FIG. 4 returns a value indicating whether the system is enabled. If the system is not enabled, the control system branches to step 20 to reset the statistics. The statistics reset can include, by way of example and not limitation, the enable timer, the accumulation timer, the acceleration ratios, the ratio sum, the average ratio, and the integrated ratio. If the system is enabled, the control system progresses to query 22 to determine if the actual acceleration is greater than a threshold value. If the actual acceleration is not greater than the threshold value, the control system branches to step 20 to reset the statistics. If the actual acceleration is greater than the threshold value, the control system continues to step 24 where the ratio of the expected acceleration to the actual acceleration is calculated. This ratio increases generally linearly with increasing vehicle mass. The previous query ensures that there is acceleration, since it is required to calculate a valid ratio. After the current ratio is calculated, the control system progresses to step 26 where the current ratios are integrated over a period of time in order to compensate for noise in the vehicle acceleration values. The program then progresses to Point A labeled 28 indicating a transition between FIG. 1 and FIG. 2 for the flow diagram of the control system. The control system also returns to this point from step 20 after the statistics have been reset.

Figure 2:
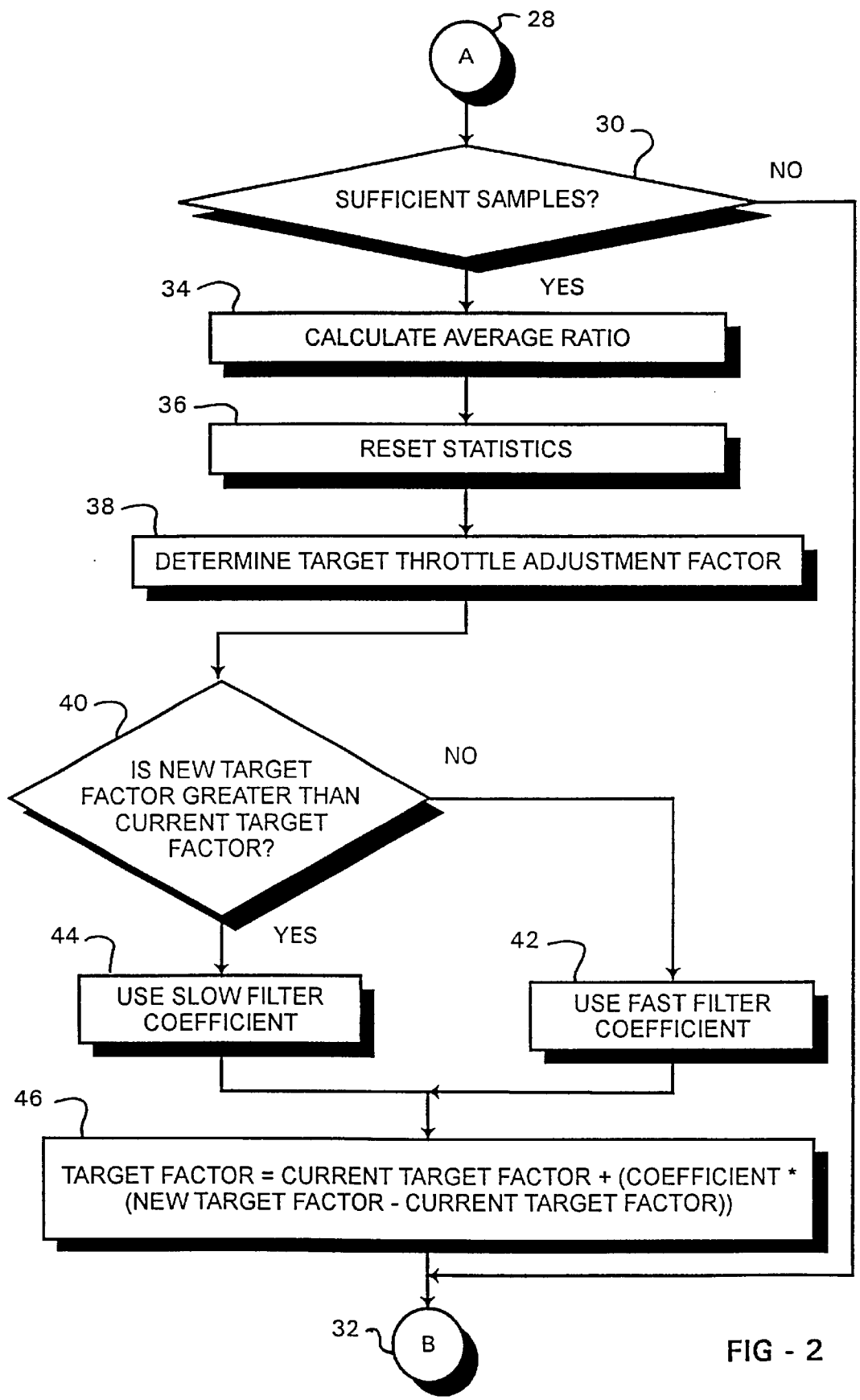
FIG. 2 is a simplified flow diagram illustrating a second portion of the control system according to the present invention.

Referring now to FIG. 2, Point A labeled 28 is repeated from FIG. 1 indicating a continuation of the simplified flow diagram of FIG. 1. The program progresses from either step 26 or step 20 to query 30 where it is determined if sufficient samples have been obtained. If sufficient samples have not been obtained, the program branches to Point B labeled as 32. If sufficient samples have been obtained, the program continues to calculate the average ratio as indicated in step 34. The statistics are then reset in step 36 to prepare for another learn cycle. The target throttle adjustment factor is then determined as a function of the average ratio in step 38.

The control system according to the present invention then continues to query 40 to determine if the current target throttle adjustment factor is greater than the previous target throttle adjustment factor. This query is applied in order to select a slow filter coefficient if the vehicle is loaded, and to select a fast filter coefficient if the load of the vehicle has been reduced. If the current target throttle adjustment factor is not greater than the previous target throttle adjustment factor, the program branches to step 42 in order to use a fast filter coefficient. The fast filter coefficient is selected to learn quickly if the load was dropped to avoid a touchy pedal. If the current target throttle adjustment factor is greater than the previous target throttle adjustment factor, the control system branches to step 44 to use a slow filter coefficient. The slow filter coefficient is selected if pulling a heavy load to avoid big changes in the performance on one learned cycle. After selection of the filter coefficient through step 42, or step 44, the control system program according to the present invention continues to step 46 where the previous target throttle adjustment factor is added to the filter coefficient times the difference between the current throttle adjustment factor minus the previous target throttle adjustment factor. After calculation of the new target throttle adjustment factor in step 46, the control system program progresses to Point B, labeled 32 in FIG. 2 indicating a transition from FIG. 2 to FIG. 3 in the simplified flow diagram according to the present invention.

Figure 3:
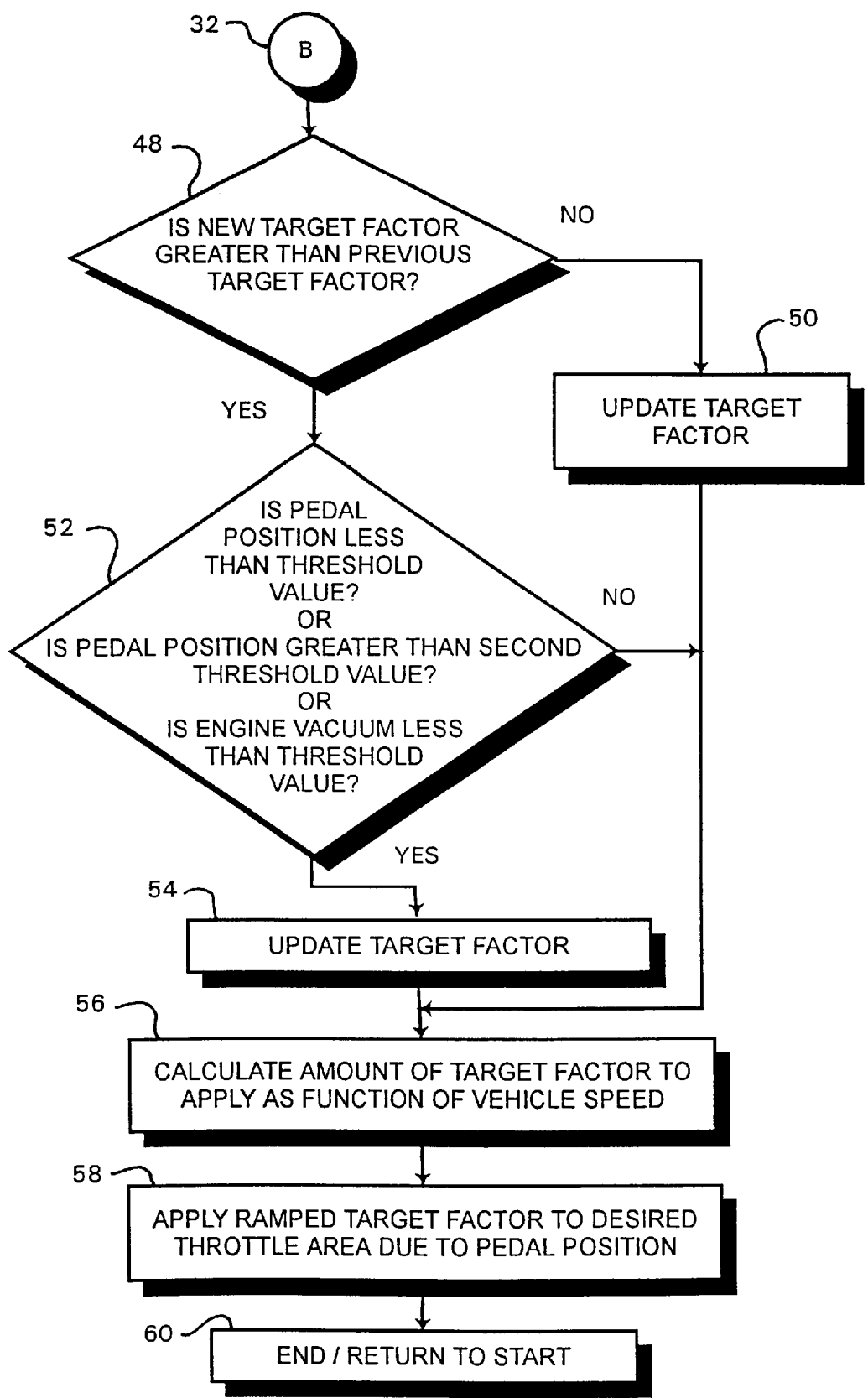
FIG. 3 is a simplified flow chart illustrating a third portion of the control system according to the present invention.

Referring now to FIG. 3, the control system program continues to query 48 from the function performed in step 46 or the negative response to query 30. In query 48, it is determined if the new target factor is greater than the previous target factor held in nonvolatile memory. If the new target factor is not greater than the previous target factor, the control system program branches to step 50 to update the target factor immediately. If the new target factor is greater than the previous target factor the control system program continues to query 52 where it is determined if the pedal position is less than a first threshold value, or if the pedal position is greater than a second threshold value, or if the engine vacuum is less than a threshold value. Preferably, the threshold value for the engine vacuum is determined from a lookup table based on revolutions per minute (rpm) of the engine. If the answer to all of the questions in query 52 is no, the control program bypasses the update target throttle adjustment factor step 54. If the pedal position is less than a first threshold value, or if the pedal position is greater than a second threshold value, or if the engine vacuum is less than a threshold value, the control system program continues to step 54 where the target throttle adjustment factor is updated. This portion of the control system updates the adjustment factor in a way to avoid a sudden increase in the adjustment factor. In addition, the control system delays the update until either the pedal position is low (adjacent the home or zero position), or the pedal position is high (adjacent the full open throttle position), or engine vacuum is low, before performing the update, so that the adjustment will not be noticed by the vehicle operator. After updating the target factor in step 54 or step 50, or bypassing with a negative response to query 52, the control program continues to step 56 where the amount of target factor to apply is calculated as a function of vehicle speed. This calculation is performed to ramp the full effect of the throttle adjustment factor in at some vehicle speed greater than zero in order to give time for the acceleration calculation to accurately determine if the load was removed. This in turn gives time to reduce the throttle adjustment factor before it gets applied to avoid a touchy pedal right at the point of a vehicle launch. After the ramp function has been calculated in step 56, the control system continues to step 58 where it applies the ramped target throttle adjustment factor to provide the desired throttle area in response to the pedal position to produce the desired acceleration feel. After application of the ramped target throttle adjustment factor in step 58, the program continues to step 60 where the program either ends, or returns to the start step 10. Preferably, the program enters the start step 10, by way of example and not limitation, at a 62.5 millisecond interval rate.

Figure 4:
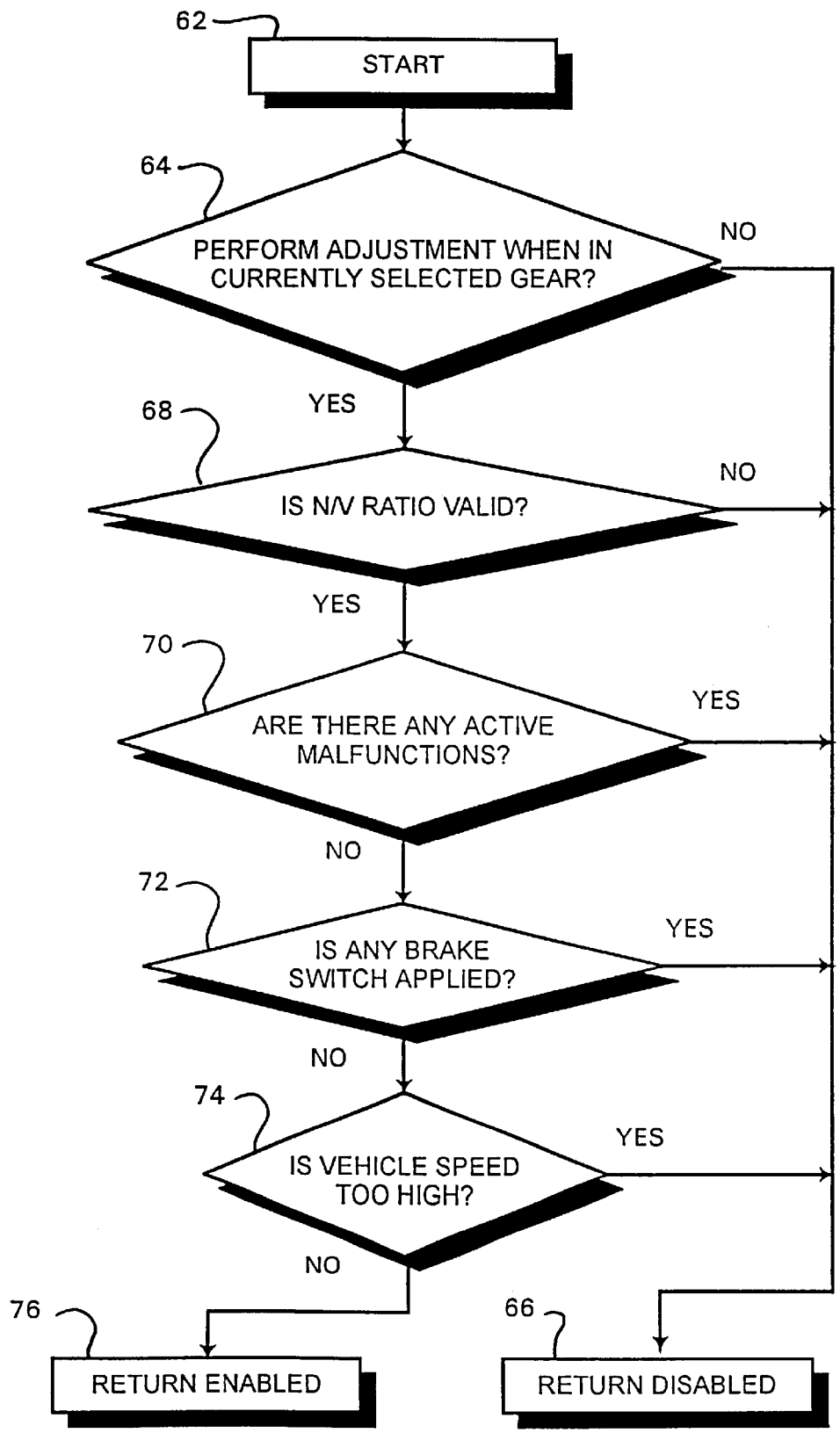
FIG. 4 is a simplified flow diagram illustrating a fourth portion of the control system according to the present invention.

Referring now to FIG. 4, the enablement logic is shown in a simplified flow diagram according to the present invention. The enablement logic subroutine illustrated in FIG. 4 begins with the start step labeled 62. The subroutine continues to query 64 where it is determined whether performing an adjustment when in the currently selected gear is allowed. If adjustment of the target factor when the vehicle is in the currently selected gear is not allowed, the control subroutine branches to step 66 where it returns a disabled signal. If performing adjustment of the target factor is allowed when in the currently selected gear, or allowed in any gear, the control subroutine continues to query 68 where it is determined if the N/V ratio is valid. If the N/V ratio is not valid, the subroutine program branches to step 66 where it returns a disabled signal. If the N/V ratio is valid, the control system subroutine continues to query 70 where it determines whether there are any active malfunctions that would affect acceleration. If there are active malfunctions that would affect acceleration, the control system subroutine branches to step 66 where it returns a disabled signal. If there are no active malfunctions that would affect acceleration, the control system subroutine continues to query 72 where it is determined if any brake switches are applied. If any brake switch is applied, the control program subroutine branches to step 66 where it returns a disabled signal. If there are no brake switches applied, the control program subroutine continues to query 74 where it is determined if the vehicle speed is too high for an adjustment of the target factor. If the vehicle speed is too high, the control program branches to step 66 where the subroutine returns a disabled signal. If the vehicle speed is not too high, the control program subroutine continues to step 76 where the subroutine returns an enabled signal. The enabled signal of step 76 or the disabled signal of step 66 is returned to the query 18 illustrated in FIG. 1 where it is determined whether the control system is enabled or disabled.

According to the present invention vehicle acceleration rates can be used to determine if the vehicle is loaded down and changes can be made to the throttle progression curve to compensate for the additional load to maintain powertrain response. The control system program evaluates vehicle acceleration in a predetermined gear, or in all gears if desired, as a measure of total mass of the system, such as a truck and trailer if applicable. Deviations from a target acceleration rate are used by the control system according to the present invention to modify the throttle progression curve. By way of example and not limitation, the target acceleration according to the present invention can be derived from a 17×9 cell table with gear box torque and vehicle speed as the axes of the table. Gear box torque can be calculated as the product of engine brake torque, a 0 to 2 multiplier versus slip across the torque convertor, and N/V ratio. The points for gear box torque would extend, by way of example and not limitation, between 0 foot-pounds to 480 foot-pounds in 30 foot-pound increments, and vehicle speed would run from 0 miles per hour to 40 miles per hour in 5 mile per hour increments. The vehicle acceleration used for comparison could be that calculated for the traction control throttle modifier, or from the acceleration governing control system.

The control system to adjust the throttle adjustment factor or throttle modifier is enabled when: the current gear is the proper gear for adjustment; the N/V ratio is less than or equal to a predetermined value, such as a calibration value; there are no active malfunctions present, such as misfire, that would affect acceleration; no brake switches are active; and vehicle speed is less than or equal to the upper speed point in the predefined table (40 mph in the example given above). The modifier is always applied, but only adjusted when the enabled conditions are satisfied. If the actual acceleration is greater than a predetermined value, such as a calibration value, a throttle target area modifier is determined from a look up table based on the ratio of target acceleration over actual acceleration. Then, for system dynamic damping, the actual amount used for the throttle adjustment modifier or factor is filtered from the target value. In this case, it may take several events to fully adjust the response when loaded.

By way of example and not limitation, a typical series of events may proceed in the following matter. A launch of the vehicle in first gear determines that a throttle adjustment modifier of 1.3 is required. The throttle adjustment modifier is changed from the current 1.0 to 1.2 in the control system program. A second launch of the control system program still determines that a throttle adjustment modifier of 1.3 is required. The control system program then changes the throttle adjustment modifier to increase the value from 1.2 to 1.27. Finally, a third launch of the control system program indicates a throttle adjustment modifier of 1.3 is still required. The control system program incrementally increases the throttle adjustment modifier from 1.27 to 1.3. This rate of increase to the target throttle adjustment modifier is selected to ensure that subsequent accelerations in the upper gears do not rapidly or unexpectedly change from one event to the next. The process of filtering up to the desired throttle adjustment modifier allows the system to filter out any noise in the acceleration rates that may result from launches on grades that would create a lower than desired acceleration rate. The change to the throttle adjustment modifier that is actually applied to the throttle progression curve is preferably applied in a manner to avoid sudden changes that may be detected by the vehicle operator. If the throttle adjustment modifier is increasing, the throttle adjustment is not made, since it would run the risk of causing undesirable disturbances that may be sensed by the vehicle operator. The changes to the applied throttle adjustment modifier, if increasing, will only occur when vacuum is less than a predetermined value, such as a calibration value, or when the acceleration pedal is less than a first predetermined value, such as a calibration value, or when the acceleration pedal is greater than a second predetermined value, such as a calibration value. If the throttle adjustment modifier is decreasing, as can occur when the load has been dropped, it is desirable to remove the modification quickly and without regard to vacuum conditions or pedal positions.

If the actual acceleration is greater than the target acceleration, the throttle adjustment modifier is adjusted downward at a greater rate than it is adjusted upward. This method of operation quickly adjusts the acceleration performance once a load has been removed from the vehicle. If the downward rate reduction to the throttle adjustment modifier is too great, the vehicle will over react to a launch down a grade. This reduction rate is selected to correctly balance the need to reduce the acceleration performance once a load has been removed from the vehicle while reducing the likelihood that the vehicle will react to a launch down a grade. By having different rates for increasing the throttle adjustment modifier versus decreasing the throttle adjustment modifier, the modification is always accomplished by increasing slowly, while decreasing quickly or immediately if required.

Acceleration performance can also be modified once a load has been removed from the vehicle by multiplying the throttle adjustment modifier before applying the modifier by a calibratable factor versus vehicle speed. This method can be used to ramp the full effect of the throttle adjustment modifier in at some vehicle speed greater than zero, such as between 10 mph to 15 mph, to give time for the acceleration calculation to accurately determine if the load has been removed. This method also gives time to reduce the throttle adjustment modifier before the modifier gets applied to avoid a touchy pedal right at vehicle launch. The target acceleration is self compensating for altitude since the target acceleration incorporates gear box torque which reflects changes in barometric pressure. The acceleration base throttle modifier is kept in nonvolatile memory from one ignition cycle to the next.

What is claimed is:

1. A control method for maintaining power train responsiveness to compensate for different vehicle loads comprising the steps of:
   calculating an actual vehicle acceleration rate based on measured vehicle speed for evaluation of total vehicle weight and load being propelled by a vehicle;
   looking up a target vehicle acceleration rate in a table based on delayed gear box torque and vehicle speed;
   comparing a calculated actual vehicle acceleration rate to the target vehicle acceleration rate; and
   adjusting a throttle progression curve based on results of the comparing step so that a subsequent actual vehicle acceleration rate is closer to the target vehicle acceleration rate.

2. The control method of claim 1 further comprising the step of:
   compensating for altitude in the target vehicle acceleration by using gear box torque to reflect changes in barometric pressure.

3. The control method of claim 1 further comprising the step of:
   looking up a throttle adjustment factor in a table based on the target vehicle acceleration rate and the actual vehicle acceleration rate.

4. The control method of claim 1 further comprising the step of:
   preventing application of a revised throttle adjustment factor when engine vacuum is greater than a predetermined vacuum value.

5. The control method of claim 1 further comprising the step of:
   storing the target vehicle acceleration in non-volatile memory between ignition cycles.

6. A control method for maintaining power train responsiveness to compensate for different vehicle loads comprising the steps of:
   calculating an actual vehicle acceleration rate based on measured vehicle speed for evaluation of total vehicle weight and load being propelled by a vehicle;
   comparing a calculated actual vehicle acceleration rate to a target vehicle acceleration rate;
   adjusting a throttle progression curve based on results of the comparing step so that a subsequent actual vehicle acceleration rate is closer to the target vehicle acceleration rate; and
   determining a throttle adjustment factor based on a ratio of target vehicle acceleration rate to actual vehicle acceleration rate.

7. The control method of claim 6 further comprising the step of:
   prior to performing the determining step, averaging a ratio of target vehicle acceleration rate to actual vehicle acceleration rate over a predetermined period of time to reduce noise and driver induced fluctuations.

8. The control method of claim 6 further comprising the step of:

filtering the throttle adjustment factor with a predetermined maximum throttle adjustment value to prevent drastic changes in power train acceleration.

9. The control method of claim 6 further comprising the step of:
ramping the throttle adjustment factor in from zero vehicle speed to prevent drastic changes in vehicle response if a load has been removed from the vehicle.

10. The control method of claim 6 further comprising the step of:
if a current vehicle acceleration ratio is less than the target vehicle acceleration ratio, adjusting the throttle adjustment factor downward at a first predetermined rate.

11. The control method of claim 10 further comprising the step of:
if the current vehicle acceleration ratio is greater than the target vehicle acceleration ratio, adjusting the throttle adjustment factor upward at a second predetermined rate less than the first predetermined rate.

12. A control method for maintaining power train responsiveness to compensate for different vehicle loads comprising the steps of:
calculating an actual vehicle acceleration rate based on measured vehicle speed for evaluation of total vehicle weight and load being propelled by a vehicle;
comparing a calculated actual vehicle acceleration rate to a target vehicle acceleration rate;
adjusting a throttle progression curve based on results of the comparing step so that a subsequent actual vehicle acceleration rate is closer to the target vehicle acceleration rate; and
applying a throttle adjustment factor to the throttle progression curve in a manner to minimize perceivable changes in the throttle adjustment factor.

13. The control method or claim 12 further comprising the step of:
applying the throttle adjustment factor when an acceleration pedal position is less than a predetermined low value.

14. The control method of claim 12 further comprising the step of:
applying the throttle adjustment factor when an acceleration pedal position is greater than a predetermined high value.

15. The control method of claim 12 further comprising the step of:
applying the throttle adjustment factor when engine vacuum is less than a predetermined vacuum value.

16. The control method of claim 15 further comprising the step of:
determining the predetermined vacuum value from a lookup table based on revolutions per minute of the engine.

17. A control method for maintaining power train responsiveness to compensate for different vehicle loads comprising the steps of:
calculating an actual vehicle acceleration rate based on measured vehicle speed for evaluation of total vehicle weight and load being propelled by a vehicle;
comparing a calculated actual vehicle acceleration rate to a target vehicle acceleration rate;
adjusting a throttle progression curve based on results of the comparing step so that a subsequent actual vehicle acceleration rate is closer to the target vehicle acceleration rate; and preventing application of a revised throttle adjustment factor when an acceleration pedal position is between a predetermined low value and a predetermined high value.

18. A control system for maintaining power train responsiveness to compensate for different vehicle loads comprising:
means for calculating an actual vehicle acceleration rate based on measured vehicle speed for evaluation of total vehicle weight and load being propelled by a vehicle;
means for looking up a target vehicle acceleration rate in a table based on delayed gear box torque and vehicle speed;
means for comparing a calculated actual vehicle acceleration rate to the target vehicle acceleration rate; and
means for adjusting a throttle progression curve based on results of the comparing step so that a subsequent actual vehicle acceleration rate is closer to the target vehicle acceleration rate.

19. The control system of claim 18 further comprising:
central processing means for receiving an input signal and for generating an output signal in accordance with a control program stored in memory.

20. The control system of claim 18 further comprising:
means for compensating for altitude in the target vehicle acceleration by using gear box torque to reflect changes in barometric pressure.

21. The control system of claim 18 further comprising:
means for looking up a throttle adjustment factor in a table based on the target vehicle acceleration rate and the actual vehicle acceleration rate.

22. The control system of claim 18 further comprising:
means for applying a throttle adjustment factor to the throttle progression curve in a manner to minimize perceivable changes in the throttle adjustment factor.

23. The control system of claim 18 further comprising:
means for preventing application of a revised throttle adjustment factor when an acceleration pedal position is between a predetermined low value and a predetermined high value.

24. The control system of claim 18 further comprising:
means for preventing application of a revised throttle adjustment factor when engine vacuum is greater than a predetermined vacuum value.

25. The control system of claim 18 further comprising:
means for storing the target vehicle acceleration in non-volatile memory between ignition cycles.

26. A control system for maintaining power train responsiveness to compensate for different vehicle loads comprising:
means for calculating an actual vehicle acceleration rate based on measured vehicle speed for evaluation of total vehicle weight and load being propelled by a vehicle;
means for comparing a calculated actual vehicle acceleration rate to a target vehicle acceleration rate;
means for adjusting a throttle progression curve based on results of the comparing step so that a subsequent actual vehicle acceleration rate is closer to the target vehicle acceleration rate; and
means for determining a throttle adjustment factor based on a ratio of target vehicle acceleration rate to actual vehicle acceleration rate.

27. The control system of claim 26 further comprising:
prior to determining the throttle adjustment factor with the determining means, means for averaging a ratio of target vehicle acceleration rate to actual vehicle acceleration rate over a predetermined period of time to reduce noise and driver induced fluctuations.

28. The control system of claim 26 further comprising:

means for filtering the throttle adjustment factor with a predetermined maximum throttle adjustment value to prevent drastic changes in power train acceleration.

29. The control system of claim 26 further comprising:

means for ramping the throttle adjustment factor in from zero vehicle speed to prevent drastic changes in vehicle response if a load has been removed from the vehicle.

30. The control system of claim 26 further comprising:

means for adjusting the throttle adjustment factor downward at a first predetermined rate, if a current vehicle acceleration ratio is less than the target vehicle acceleration ratio.

31. The control system of claim 30 further comprising:

means for adjusting the throttle adjustment factor upward at a second predetermined rate less than the first predetermined rate, if the current vehicle acceleration ratio is greater than the target vehicle acceleration ratio.

32. A control system for maintaining power train responsiveness to compensate for different vehicle loads comprising:

means for calculating an actual vehicle acceleration rate based on measured vehicle speed for evaluation of total vehicle weight and load being propelled by a vehicle;

means for comparing a calculated actual vehicle acceleration rate to a target vehicle acceleration rate;

means for adjusting a throttle progression curve based on results of the comparing step so that a subsequent actual vehicle acceleration rate is closer to the target vehicle acceleration rate; and means for applying the throttle adjustment factor when an acceleration pedal position is less than a predetermined low value.

33. The control system of claim 32 further comprising:

means for applying the throttle adjustment factor when an acceleration pedal position is greater than a predetermined high value.

34. The control system of claim 32 further comprising:

means for applying the throttle adjustment factor when engine vacuum is less than a predetermined vacuum value.

35. The control system of claim 34 further comprising the step of:

determining the predetermined vacuum value from a lookup table based on revolutions per minute of the engine.

\* \* \* \* \*